United States Patent
Samie et al.

(10) Patent No.: US 8,056,690 B2
(45) Date of Patent: Nov. 15, 2011

(54) ROTARY-TYPE SELECTABLE ONE-WAY CLUTCH

(75) Inventors: Farzad Samie, Franklin, MI (US); Alexander Millerman, Bloomfield Hills, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 749 days.

(21) Appl. No.: 12/199,109

(22) Filed: Aug. 27, 2008

(65) Prior Publication Data

US 2009/0205918 A1 Aug. 20, 2009

Related U.S. Application Data

(60) Provisional application No. 61/028,557, filed on Feb. 14, 2008.

(51) Int. Cl.
*F16D 41/16* (2006.01)

(52) U.S. Cl. ........... 192/43.1; 192/46; 192/47; 192/69.1

(58) Field of Classification Search .................. 192/43.1, 192/46, 69.1, 93 R, 93 B, 93 C, 47, 71
See application file for complete search history.

(56) References Cited

U.S. PATENT DOCUMENTS

| | | | |
|---|---|---|---|
| 5,918,715 A | | 7/1999 | Ruth et al. |
| 5,927,455 A | * | 7/1999 | Baker et al. .................. 192/36 |
| 5,967,277 A | * | 10/1999 | Walter ......................... 192/43.1 |
| 6,196,038 B1 | * | 3/2001 | Chappoux ....................... 70/492 |
| 6,244,965 B1 | * | 6/2001 | Klecker et al. .................. 464/81 |
| 6,290,044 B1 | * | 9/2001 | Burgman et al. ................ 192/46 |
| 6,460,671 B1 | * | 10/2002 | Karambelas et al. ........... 192/36 |
| 6,745,880 B1 | * | 6/2004 | Yuergens ......................... 192/44 |
| 6,814,201 B2 | * | 11/2004 | Thomas ....................... 192/43.1 |
| 7,258,214 B2 | | 8/2007 | Pawley et al. |
| 7,484,605 B2 | * | 2/2009 | Pawley et al. ................ 192/43.1 |
| 7,849,990 B2 | * | 12/2010 | Brees et al. ..................... 192/46 |
| 2003/0173175 A1 | * | 9/2003 | Tomiyama ................... 192/3.29 |
| 2007/0056825 A1 | | 3/2007 | Fetting, Jr. et al. |
| 2007/0278061 A1 | * | 12/2007 | Wittkopp et al. ............ 192/43.1 |
| 2008/0110715 A1 | * | 5/2008 | Pawley ........................ 192/43.1 |

FOREIGN PATENT DOCUMENTS

JP 2001193761 A 7/2001

* cited by examiner

*Primary Examiner* — David D Le
*Assistant Examiner* — Jude Agendia
(74) *Attorney, Agent, or Firm* — Quinn Law Group, PLLC

(57) ABSTRACT

A transmission includes a selectable one-way clutch (SOWC) assembly. The SOWC assembly includes a rotatable pocket plate, a rotatable slide plate, and an annular piston having a ramped surface feature. The piston, which can be hydraulically actuated, moves axially toward the pocket plate when applied, and axially away from the pocket plate when released, to thereby select between two torque holding or operating modes of the SOWC assembly. The ramped surface feature of the piston engages an axial knob portion of the slide plate when the piston is applied to select to one operating mode, thus rotating the slide plate in one direction. A return spring moves the piston away from the pocket plate when the other operating mode is selected, and the slide plate is rotated via a spring in another direction. A guide pin maintains a relative position of the piston and the slide plate.

16 Claims, 4 Drawing Sheets

ROTARY-TYPE SELECTABLE ONE-WAY CLUTCH

CLAIM OF PRIORITY AND CROSS-REFERENCE TO RELATED APPLICATION

This application claims the benefit of and priority to U.S. Provisional Patent Application No. 61/028,557, filed on Feb. 14, 2008, which is hereby incorporated by reference in its entirety.

TECHNICAL FIELD

The present invention relates to a selectable one-way clutch (SOWC) assembly having various rotatable races or plates, including a pocket plate, a notch plate, and a selector ring or slide plate, with the SOWC assembly being shiftable via a hydraulic piston when the three plates are rotating.

BACKGROUND OF THE INVENTION

In various mechanical devices, and particularly within automatic vehicle transmissions, specialized overrunning or one-way clutches are used to produce a one-way driving connection between the input and output members of the transmission. In particular, a one-way clutch has a pair of members, races, or plates capable of transmitting torque when the rotation of one plate with respect to the other is in one direction, with the clutch "overrunning" or freewheeling when the rotational direction is reversed.

The relative shape and/or orientation of the plates may vary depending on the particular clutch design. Certain one-way clutches have input and output races or plates that are oriented in a radially-concentric manner with respect to each other. Alternately, the confronting or mating faces of the plates have a planar orientation or relationship. The mechanical means used to lock a typical one-way clutch are varied, but commonly consist of torque-transmitting elements such as rollers, sprags, rockers, or struts that are positioned between the plates. Depending on the particular type or style of one-way clutch and the direction of rotation, each plate may contain unique surface features suitable for engaging one or more of the struts in order to selectively enable various clutch operating modes.

In a basic one-way clutch, the operating mode is determined by the direction of the torque being applied to an input race or plate of the clutch. However, the increased complexity of power transmitting mechanisms has led to a class of selectable one-way clutches. A selectable one-way clutch or SOWC is similar to a one-way clutch in operation, as described above. As the name implies, a SOWC is capable of producing a driving connection between the input and output plates in one or both rotational directions, and/or is able to freewheel in one or both rotational directions as needed. In a conventional SOWC, one of the two plates is indexed or grounded to a stationary member, such as a transmission case or center support, and therefore can be less than optimal when used in certain applications.

SUMMARY OF THE INVENTION

Accordingly, a SOWC assembly is provided having a selector ring or a slide plate, a pocket race or plate, and a notch race or plate, each being rotatable with respect to the others. The SOWC assembly is a two-mode device which can be selectively locked in either rotational direction to thereby establish one of the two operating modes when the pocket plate, slide plate, and the notch plate are rotating at approximately the same speed. That is, the SOWC assembly can be engaged without indexing or grounding either of the pocket or notch plates to a stationary member of the transmission in the conventional manner.

In addition to the pocket plate, the slide plate, and the notch plate, the SOWC assembly includes an annular piston having a ramped surface feature that is specially adapted for actuating the SOWC assembly. In one embodiment, fluid pressure can be used to move the annular piston in a first axial direction toward the pocket plate to apply the annular piston. An axial portion of the slide plate, such as a knob or an arm, is trapped by the ramped surface feature. Continued rotation of the plates rotates the slide plate sufficiently so as to shift the SOWC from a first or forward operating mode into a second or a reverse operating mode. The axial motion of the piston is thus translated into rotational movement of the slide plate. Likewise, release or disengagement of the annular piston shifts the SOWC back into the first or forward operating mode.

The pocket plate can be configured with a through-hole or slot with first and second ends. The knob portion of the slide plate is moved to the second end of the slot whenever the piston is applied. That is, the knob portion rides over the ramped surface feature so that the knob portion rotates as the piston is applied, thereby selecting an "engaged" or first operating mode of the SOWC assembly, i.e., the reverse mode. A second of the two operating modes, i.e., the forward mode, is selected as the piston is released or moves away from the pocket plate. To facilitate movement of the knob portion, a biasing spring or other suitable device can bias the knob portion against the first end of the slot once a return spring moves the piston in a second axial direction.

Within the SOWC assembly, an annular plate, plate, or dam is positioned between the piston and the slide plate to restrict travel of the piston toward the slide plate whenever the piston is applied, thus minimizing impingement of the slide plate if the piston is moved too far during its application. A guide pin can be inserted into each of the piston and the dam, and allowed to freely move in and out of the dam. The guide pin maintains a relative position of the piston and the slide plate as the piston and the slide plate rotate at a relatively high rate of speed and accelerate.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
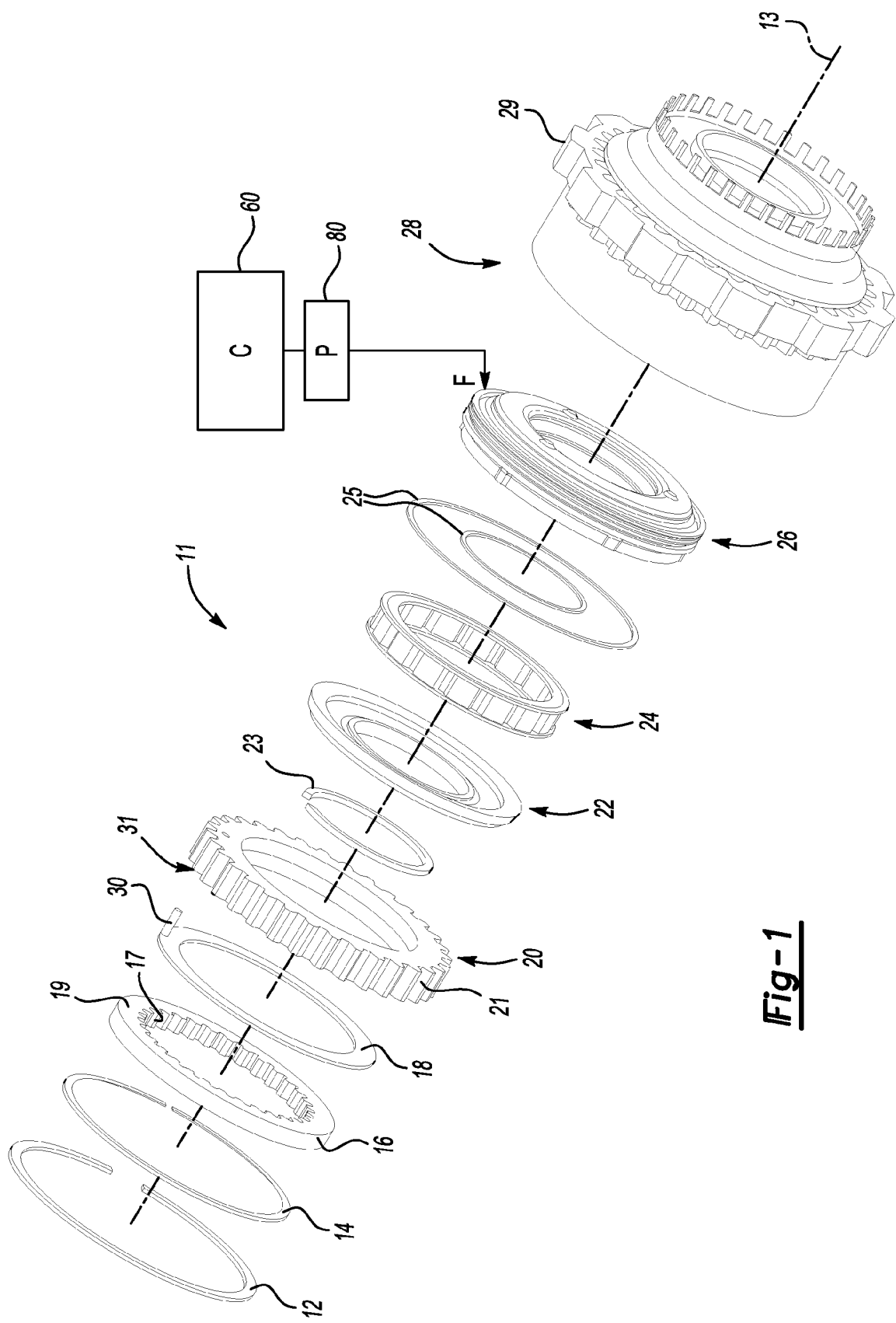
FIG. 1 is an exploded schematic perspective view of a SOWC assembly in accordance with the invention.

With reference to the Figures, wherein like reference numerals refer to like or similar components throughout the several figures, and beginning with FIG. 1, a selectable one-way clutch (SOWC) assembly 11 has an axis of rotation 13. Therefore, the term "axial" and "axial direction" as used herein refers to the relative position of a given feature or movement with respect to the axis 13. The SOWC assembly 11 also includes a first race or a notch plate 16, a selector ring or slide plate 18, and a second race or a pocket plate 20. The notch plate 16 has internal teeth or splines 17, while the pocket plate 20 has external teeth or splines 21. The slide plate 18 has an axial extension or an axial knob portion 30 for selecting the two modes of the SOWC assembly 11, as described below.

Although not shown in FIG. 1 for simplicity, it will be understood by those of ordinary skill in the art that a notch plate such as the notch plate 16 of FIG. 1 is a rotatable race having a series of interspaced notches or wells formed in a surface 19, with each well (not shown) configured for retaining a mating, spring-biased torque holding piece, commonly referred to as a strut (not shown). Depending on the rotational position of the slide plate 18, various struts can be selectively blocked or unblocked by the slide plate 18, deploying through mating windows (not shown) in the slide plate 18 when unblocked and into a mating pocket (not shown) formed in a surface 31 of the pocket plate 20. Once the struts (not shown) are positioned within their respective pockets (not shown), rotation of the SOWC assembly 11 in one or both rotational directions is prevented by the struts (not shown). As used herein, the first operating mode or forward mode allows some of the struts to hold torque in a clockwise direction, i.e., in the direction of engine torque, while the second operating mode or reverse mode allows other struts to hold torque in the counterclockwise direction, i.e., in a the direction opposite that of the engine torque.

The SOWC assembly 11 includes an annular apply piston 26 having a ramped surface feature 50 (see FIGS. 2-4) adapted to engage the slide plate 18 when the piston 26 is applied to establish the second operating mode, as will be described below. In one embodiment, the piston 26 can be hydraulically-actuated using fluid pressure (arrow F) provided by a pressurized fluid source (P) 80, although other mechanical, electrical, or electro-mechanical actuation methods may be used within the scope of the invention. The source 80 can be commanded by a controller 60 having an appropriate shift algorithm (not shown), with the controller 60 being part of an overall transmission controller or a separate device as desired. The SOWC assembly 11 can also include an annular dam 22 that is sufficiently shaped or configured to allow a return spring 24 or other suitable return device to be seated therein. The dam 22 also acts to limit the travel or range of motion of the piston 26 whenever the piston 26 is being applied, as will be discussed below.

The return spring 24 can be any device adapted for providing a sufficient return force for moving the piston 26 in an axial direction with respect to the axis or rotation 13 of the SOWC assembly 11 when the piston 26 is not applied or is disengaged to establish the first or forward operating mode, as will be explained below. In the exemplary embodiment shown in FIG. 1, the return spring 24 is configured as an annular spring cage or a series of interspaced helical coil springs, although other spring devices may be used within the scope of the invention. Various retaining clips or rings 12, 14, 23, and 25 may also be used to help secure the different parts of the SOWC assembly 11 to each other and/or to secure the SOWC assembly 11 within the transmission 10 (see FIG. 1A), with the SOWC assembly 11 being splined within an outer clutch housing, drum, or center support 28 having external splines 29 for engagement with a stationary member (not shown), such as a transmission housing.

Figure 1A:
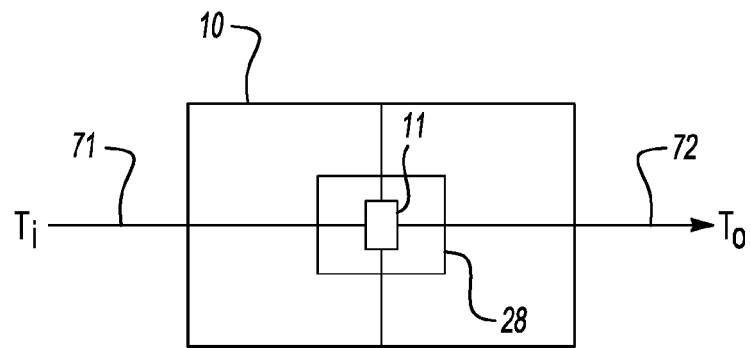
FIG. 1A is a schematic illustration of a transmission having the SOWC assembly of FIG. 1.

Referring to FIG. 1A, the SOWC assembly 11 of FIG. 1 can be used to selectively establish different operating modes in a transmission 10 having a rotatable first member 71 and a rotatable second member 72. The first member 71 has an input torque Ti, referring to an inlet torque into the SOWC assembly 11, and is operatively connected to the notch plate 16 of the SOWC assembly 11. The output member 72 has an output torque To, i.e., an output torque from the SOWC 11, and is operatively connected to the pocket plate 20. The entire SOWC assembly 11 is positioned in or supported by the drum or center support 28, as will be understood by those of ordinary skill in the art. The SOWC assembly 11 therefore holds torque in one or the other rotational direction, depending on which of the two operating modes is selected, and thus can transfer the input torque Ti from the notch plate 16 and the first member 71 to the pocket plate 20 and output member 72, as needed, which then rotates with the output torque To.

Figure 2:
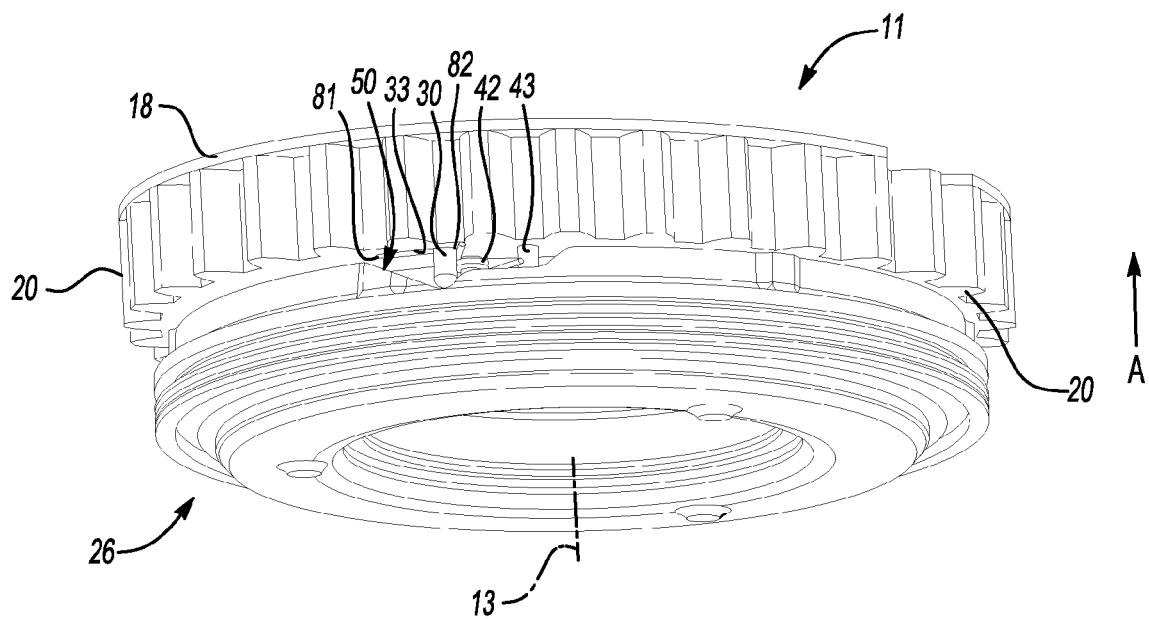
FIG. 2 is a schematic perspective view of a portion of the SOWC assembly shown of FIG. 1 in a first operating mode.

Referring to FIG. 2, a portion of the SOWC assembly 11 of FIG. 1 is shown as it appears when the piston 26 is fully applied in the direction of arrow A. Such a fully applied position provides a second or reverse operating mode of the SOWC assembly 11. The knob portion 30 of the slide plate 18 protrudes through a through-hole or a slot 33 formed or otherwise provided in the pocket plate 20. The slot 33 has a first end 82 and a second end 81. The knob portion 30 is shown at the limit of its range of motion within the slot 33, and adjacent to the first end 82 of the slot 33.

In accordance with the invention, the piston 26 is formed or provided with a notch or a ramped surface feature 50, as will be described in more detail below with reference to FIG. 3. The ramped surface feature 50 allows the piston 26 to trap or engage the knob portion 30 to thereby force or move the knob portion 30 to the first end 82 of the slot 33, which is the position shown in FIG. 2. A biasing spring 42 acts on each of the knob portion 30 and a post 43 formed integrally with or operatively connected to the notch plate 20. Force applied by the piston 26 in the direction of arrow A acts to overcome any biasing force provided by the biasing spring 42.

Figure 3:
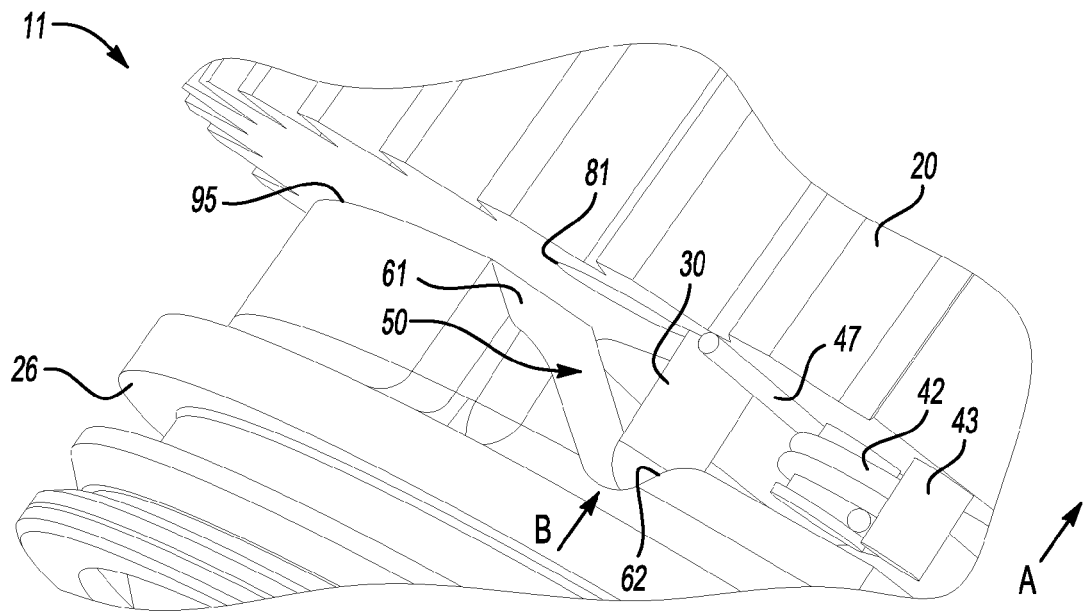
FIG. 3 is a schematic partial perspective view of a portion of the SOWC assembly shown in FIGS. 1 and 2.

Referring to FIG. 3, a more detailed view is provided of the ramped surface feature 50 of the piston 26 relative to the positioning of the knob portion 30. The ramped surface feature 50 has a first angled surface 61 and a second angled surface 62 that are machined into or formed integrally with the piston 26 along a surface 95 thereof, with the surface 95 being a surface of piston 26 that is immediately adjacent to the notch plate 20. The junction of the surfaces 61 and 62 form a substantially V-shaped profile or valley, as indicated by arrow B, in which the knob portion 30 is ultimately engaged or trapped during rotation of the notch plate 20 as the piston 26 is applied in an axial direction, i.e., in the direction of arrow A of FIG. 2.

In the position shown in FIG. 3, the return spring 24 (see FIG. 1) is fully compressed, and an extension or arm portion 47 of the biasing spring 42 applies a reaction force on the knob portion 30, thus providing a potential return force that is realized once the piston 26 is released or when the SOWC assembly 11 is shifted or transitioned back to the first or forward operating mode. The knob portion 30 of the slide plate 18 toward the first end 82 of the slot 33. Torque is thus held by the SOWC assembly 11 (see FIG. 1) in the desired direction, here the counterclockwise direction or a default forward direction that is opposite the direction of the input torque, as long as the piston 26 continues to apply a sufficient force in the direction of arrow A.

Figure 4:
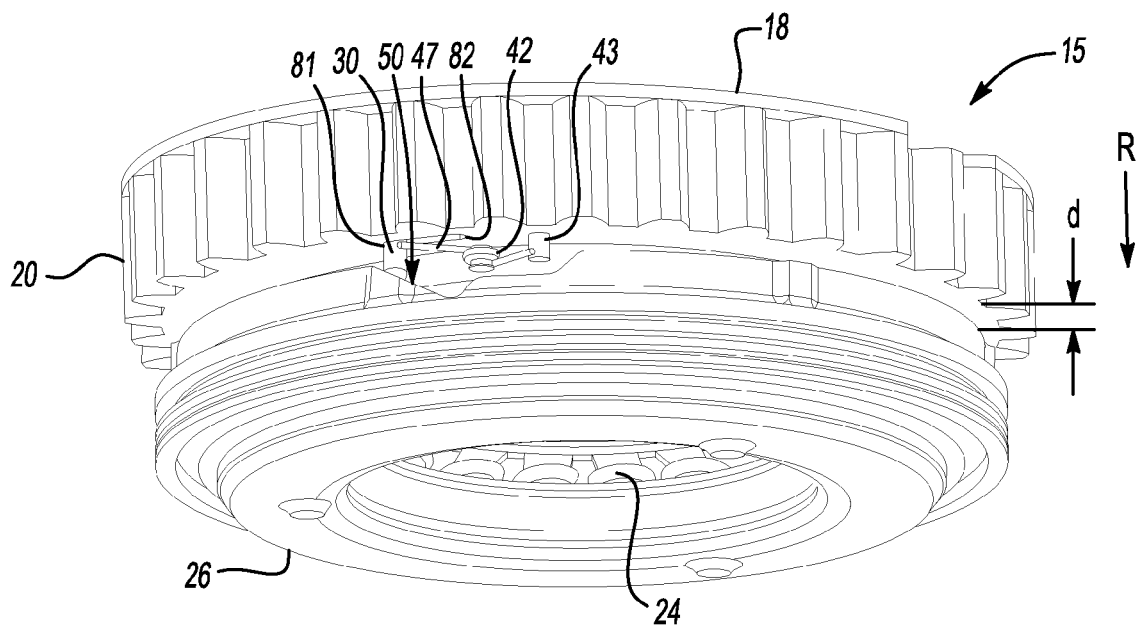
FIG. 4 is a schematic perspective view of the SOWC assembly of FIG. 1 in a second operating mode.

Referring to FIG. 4, the SOWC assembly 11 of FIG. 1 is shown as it appears when the piston 26 is fully disengaged or released in the direction of arrow R. Such a fully released position may provide a first operating mode of the SOWC assembly 11, i.e., a default forward mode. Fluid pressure F (see FIG. 1) is interrupted or discontinued, and therefore the return spring 24 is able to overcome any remaining apply force in the direction of arrow A (see FIGS. 2 and 3). The piston 26 is forced or moved a distance "d" away from the pocket plate 20 in the direction of arrow R by the return spring 24. A spring force provided by the biasing spring 42, and in particular by the extension portion or arm portion 47 thereof, reacts against the post 43 to force the knob portion 30 of the slide plate 18 away from the first end 82 and back toward the second end 81 of the slot 33. The knob portion 30 is thus disengaged from the ramped surface feature 50.

Figure 5:
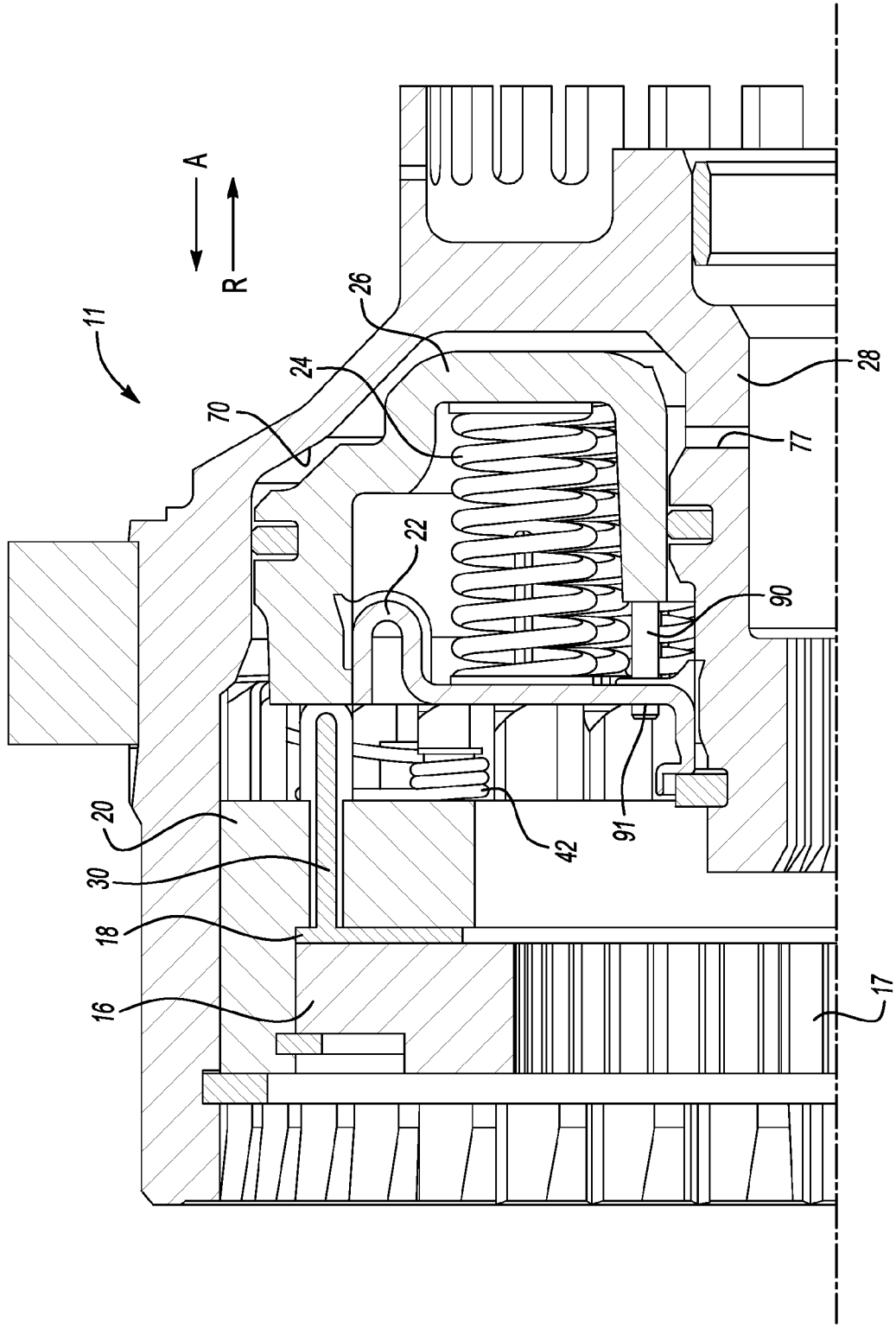
FIG. 5 is a schematic side cross-sectional view of an inner portion of the SOWC assembly of FIGS. 1-4.

Referring to FIG. 5, the SOWC assembly 11 of FIG. 1 is shown with the piston 26 in the fully disengaged or OFF position, i.e., in the position or mode corresponding to FIG. 4 as described above. The return spring 24 thus forces the piston 26 away from the pocket plate 20 in the direction of arrow R. An apply cavity 70 is provided between the piston 26 and the center support 28, with the apply cavity 70 being in fluid communication with the fluid source 80 (see FIG. 1), such as a hydraulic pump, through one or more fluid passages 77. Fluid admitted to the apply cavity 70 can thereby move the piston 26 in the direction of arrow A, such that the knob portion 30 of the slide plate 18 ultimately engages the ramped surface feature 50 (see FIG. 3) and compresses or energizes the biasing spring 42 as described above.

The respective relative positions of each of the piston 26 and the slide plate 18 remain consistent, as they rotate at relatively high speeds and/or as they accelerate. In order to ensure the constant relative positioning of the piston 26 with respect to the slide plate 18, and vice versa, a guide pin 90 can be inserted into the piston 26 and adapted to freely move in and out of an opening 91 formed or provided in the dam 22. Also, maximum travel of the piston 26 is restricted by the presence of the dam 22, thereby preventing inadvertent interference with or damage to the slide plate 18 by the piston 26 as the piston 26 is applied.

While the best modes for carrying out the invention have been described in detail, those familiar with the art to which this invention relates will recognize various alternative designs and embodiments for practicing the invention within the scope of the appended claims.

The invention claimed is:

1. A selectable one-way clutch (SOWC assembly) for a vehicle comprising:
   a rotatable pocket plate;
   a rotatable notch plate;
   a rotatable slide plate having an axial knob portion, said slide plate being positioned between said pocket plate and said notch plate, wherein said axial knob portion is moveable between a first position and a second position to thereby select a corresponding first and second operating mode of the SOWC assembly;
   an annular piston having a ramped surface feature adapted to engage said knob portion of said slide plate when said annular piston is applied in a first axial direction, such that a rotation of said slide plate with respect to said ramped surface portion moves said axial knob portion to said second position to thereby select said second operating mode; and
   a biasing spring adapted to move said axial knob portion to said first position when said annular piston is released in a second axial direction to thereby select said first operating mode.

2. The SOWC assembly of claim 1, wherein in said first operating mode torque is held in one direction and the SOWC assembly is allowed to freewheel in a direction opposite said one direction; and
   wherein in said second operating mode torque is held in a second direction and the SOWC assembly is allowed to freewheel in a direction opposite said second direction.

3. The SOWC assembly of claim 1, wherein said surface feature allows the SOWC assembly to be shifted to establish said second operating mode when said pocket plate and said notch plate are rotating at approximately the same speed.

4. The SOWC assembly of claim 3, wherein said pocket plate includes an axial post extending in the same axial direction as said axial knob portion; and
   wherein said biasing spring is positioned between said axial post and said axial knob portion, said biasing spring applying a reaction force to said axial post and a biasing force to said axial knob portion such that said biasing spring rotates said slide plate from said second position to said first position when said annular piston is released in said second axial direction.

5. The SOWC assembly of claim 1, wherein said ramped surface feature forms a substantially V-shaped notch.

6. The SOWC assembly of claim 1, further comprising a return spring, wherein further comprising an annular dam adapted to limit travel of said annular piston in said first axial direction;
   wherein said at least one spring includes a return spring positioned between said annular dam and said annular piston, said return spring being adapted to release said annular piston in said second axial direction.

7. The SOWC assembly of claim 6, further comprising a guide pin;
   wherein said guide pin is inserted into each of said annular piston and said annular dam; and
   wherein said guide pin freely moves into and out of said annular dam to thereby maintain a relative position of said annular piston and said slide plate when said annular piston and said slide plate are rotating.

8. A selectable one-way clutch (SOWC) assembly for use with a vehicle transmission, the SOWC assembly having a first and a second operating mode, comprising:
   a rotatable pocket plate having a slot with a first end and a second end;
   a rotatable notch plate;
   a rotatable slide plate positioned between said pocket plate and said notch plate, and having an axial knob portion that is positioned within said slot and slidably moveable between said first and second ends of said slot;
   an annular piston that is movable in a first axial direction toward said pocket plate and into contact therewith to thereby apply said annular piston, thereby selecting the second operating mode, and moveable in a second axial direction away from said pocket plate and out of contact therewith to thereby release said annular piston to thereby select the first operating mode;
   wherein said annular piston has a ramped surface feature adapted to engage said axial knob portion and move said axial knob portion from said second end to said first end of said slot to thereby select the second operating mode.

9. The SOWC assembly of claim 8, further comprising a biasing spring;
  wherein said biasing spring includes an arm portion that biases said knob portion to said second end of said slot when said first operating mode is selected.

10. The SOWC assembly of claim 8, further comprising an annular dam;
  wherein said annular dam is positioned between said annular piston and said slide plate, and is adapted to restrict a maximum travel of said annular piston toward said slide plate when said annular piston is moved in said first axial direction.

11. The SOWC assembly of claim 10, further comprising a guide pin; wherein said guide pin is inserted into said annular piston and said annular dam, and is configured for freely moving in and out of said annular dam for maintaining a relative position of said annular piston and said slide plate.

12. The SOWC assembly of claim 10, further comprising a return spring adapted for applying a return force to said annular piston sufficient for moving said annular piston away a predetermined axial distance away from said pocket plate when said first operating mode is selected.

13. A transmission comprising:
  a first rotatable member;
  a second rotatable member;
  a pump operable for delivering a supply of pressurized fluid; and
  a SOWC assembly having a rotatable notch plate connected to said first rotatable member for receiving an input torque, a rotatable pocket plate connected to said second rotatable member, a rotatable slide plate having an axial knob portion, a return spring, and an annular piston;
  wherein said annular piston is adapted to move in a first axial direction into contact with said pocket plate in response to said supply of pressurized fluid, thereby applying said annular piston, and to thereby move said axial knob portion to a first position to thereby hold torque in the same direction as said input torque; and
  wherein said return spring is adapted to move said annular piston in a second axial direction out of contact with said pocket plate to thereby hold torque in the opposite direction as said input torque, thereby releasing said annular piston.

14. The transmission of claim 13, wherein said SOWC assembly includes an apply chamber, and wherein said annular piston is positioned within said apply chamber, and is in fluid communication with said supply of pressurized fluid.

15. The transmission of claim 14, including a center support;
  wherein said SOWC assembly is positioned at least partially within said center support and supported thereby.

16. The transmission of claim 14, wherein said return spring is configured as an annular spring cage.

* * * * *